March 8, 1966 B. H. TONGUE 3,239,774
TRANSISTOR POWER SUPPLY WHICH MINIMIZES DISTORTION
Filed June 20, 1961 2 Sheets-Sheet 1

INVENTOR.
BEN HAPGOOD TONGUE
BY Rines and Rines
ATTORNEYS

TRANSISTOR POWER SUPPLY WHICH MINIMIZES DISTORTION
Filed June 20, 1961 2 Sheets-Sheet 2
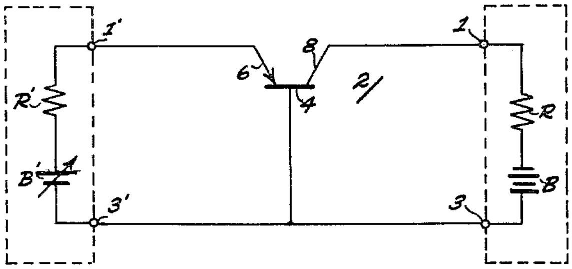
Fig. 4
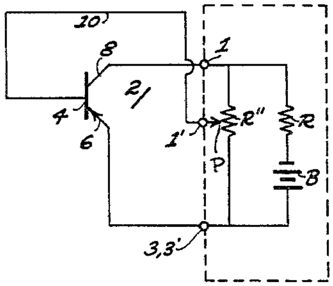
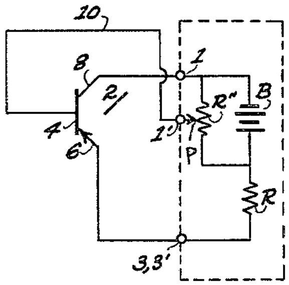
Fig. 5 Fig. 6
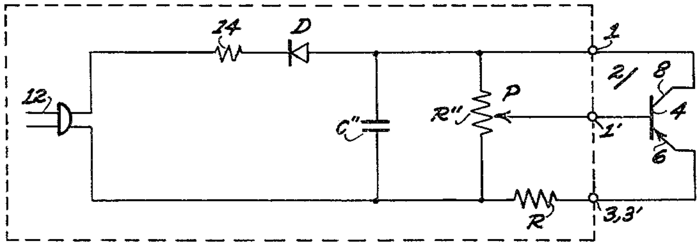
Fig. 7
INVENTOR.
BEN HAPGOOD TONGUE
BY Rines and Rines
ATTORNEYS 3,239,774

TRANSISTOR POWER SUPPLY WHICH MINIMIZES DISTORTION

Ben Hapgood Tongue, West Orange, N.J., assignor to Blonder-Tongue Electronics, Newark, N.J., a corporation of New Jersey Filed June 20, 1961, Ser. No. 118,421
4 Claims. (Cl. 330—40)

The present invention relates to power supply circuits for amplifying relays, and is particularly directed to power supplies that may be used with transistors and similar relay devices.

The art is replete with a host of different types of power supply systems for employment with electron tubes, transistors and various other kinds of amplifying relay devicies. In the field of transistors and similar relays, however, there are certain peculiarities brought about by the nature of the relays that require special conditions in the power supply circuits converting, for example, mains alternating current to direct-current electrode voltages for the relay. Most of the systems, indeed, require the use of transformers or similar devices and copious filter supply networks and the like to reduce ripple and generate a suitable direct-current voltage for operating the relay device.

An object of the present invention is to provide a new and improved power supply system that obviates the necessity for transformers, where they are not desired, and that is particularly adapted for supplying direct-current power to transistors and similar relay devices.

A further object is to provide a novel circuit that enables facile minimizing of distortion products in amplifying relays and the like.

Other and further objects will be explained hereinafter and will be more particularly pointed out in the appended claims.

The invention will now be described in connection with the accompanying drawing, FIG. 1 of which is a circuit diagram illustrating the principles of the invention as applied to a transistor relay, with the direct-current conditions only being shown;

FIG. 4 is a similar diagram of another modification, omitting the signal connections and showing only the direct-current biasing connections, for purposes of simplicity and in order not to confuse the disclosure;

FIG. 5 is a view like FIG. 4 of a preferred embodiment of the invention;

FIG. 6 is a view similar to FIG. 5 of still a further modification; and

FIG. 7 is a further view of a further preferred embodiment of the invention, employing the kind of system illustrated in FIG. 6.

Figure 1:
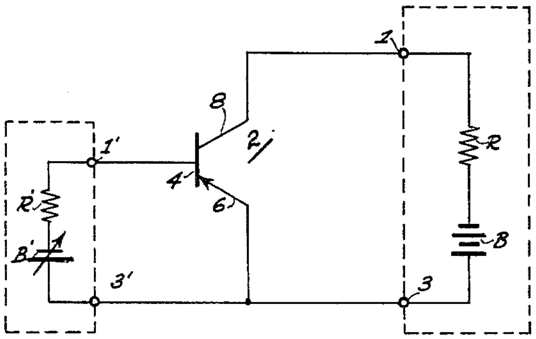

Referring to FIG. 1, a transistor or similar amplifying relay device is shown at 2 provided with a base electrode 4, emitter electrode 6, which may be grounded, if desired, and a collector electrode 8. As before stated, only the direct-current bias and supply conditions are shown in order not to confuse the disclosure and in order to illustrate the novel principles of the power supply system of the present invention, though the very circuit of FIG. 1 is shown supplied with high-frequency or lower-frequency signal connections in the respective circuits of FIGS. 2 and 3.

In accordance with the present invention, it has been discovered, furthermore, that a single control can be provided for enabling the minimizing of distortion in the amplifying relay circuit of FIG. 1 while maintaining the product of, for example, collector-to-base voltage and current in the system substantially constant. This is also to be contrasted with prior-art systems that have required adjustments in the input and output circuits for effecting such an operation. In addition, the system of FIG. 1, as will later be explained in connection with the embodiment of FIG. 7, obviates the necessity for transformers or other more conventional devices and copious filtering networks that are usually necessary to supply direct-current voltage to amplifying relays of this character.

The relays, moreover, are manufactured for use in different types of circuits, and the relays vary somewhat in properties as the result of manufacturing techniques. Standardization limits are established, however, and the relays are assigned a predetermined maximum allowable collector-to-base junction power dissipation and a predetermined voltage that is to be allowed to be developed between the collector 8 and, in the case of FIG. 1, the emitter 6.

In mass production of the circuit, transistors will be tested therein for the predetermined maximum allowable voltage and predetermined maximum allowable power dissipation, and only certain of the tested relays will be employed.

In accordance with the present invention, however, the source of direct-current power is deliberately preadjusted and designed to have a maximum available power that is only substantially equal to the said transistor predetermined power dissipation. In addition, the source is further adjusted so that its open-circuited direct-current voltage, appearing at the output terminals of the source 3 when not connected to the transistor, will be substantially equal to twice the said predetermined voltage that was pre-set as the allowable voltage for development between the collector 8 and the emitter 6 in the system of FIG. 1. Such a direct-current power source is schematically illustrated as a battery B with an internal resistance R, shown within a dotted box having output terminals 1 and 3, with the terminal 1 connected to the collector electrode 8, and the terminal 3 connected to the emitter electrode 6.

A further voltage, in the circuits of the present invention, is supplied from a further direct-current voltage source, illustrated as the variable battery B′ with its internal resistance R′ and terminals 1′ and 3′, connected between the base electrode 4 and the emitter electrode 6, respectively. This further source B′, R′ is pre-adjusted to a voltage value very small compared with the beforementioned predetermined voltage value that is to be allowed to develop between the collector 8 and emitter 6 of FIG. 1.

Under such circumstances, it has been found that one may beneficially employ the single variation adjustment of the voltage value of the direct-current source B′R′— always, however, to a voltage value very small compared with the said predetermined allowable collector-to-emitter voltage—to minimize distortion in the transistor amplifier relay 2 resulting from cross-over distortion, harmonic distortion or from any other source. The circuit of the present invention with the critical relative voltage adjustments above-described, enables this to be done, moreover, not only without the necessity for effecting any corresponding variations in the output circuit, but while maintaining the collector-to-base voltage-current product substantially constant. A facile and single adjustment, therefore, enables the minimizing of distortion for the different transistors that may be applied to circuit in mass production, and greatly simplifies the multiple kinds of controls and adjustments that have heretofore been required to effect similar results. Only if the critical relative power and voltage values above referred to, however, are produced, will the distortion minimization effect be achieved while maintaining the voltage-current product between the collector-to-base substantially constant so that no further adjustments are required.

Figure 2:
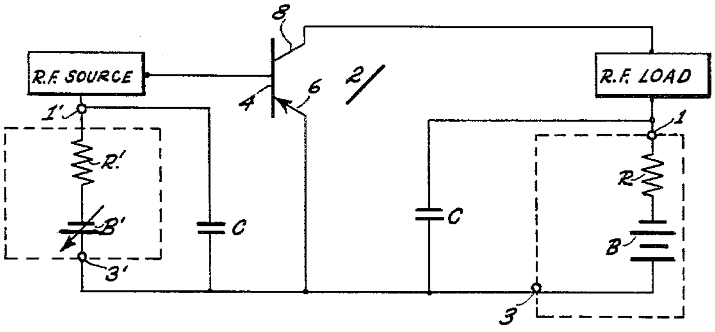
FIG. 2 is a diagram similar to FIG. 1, but including radio-frequency or other high-frequency signal circuit connections, as well.
Figure 3:
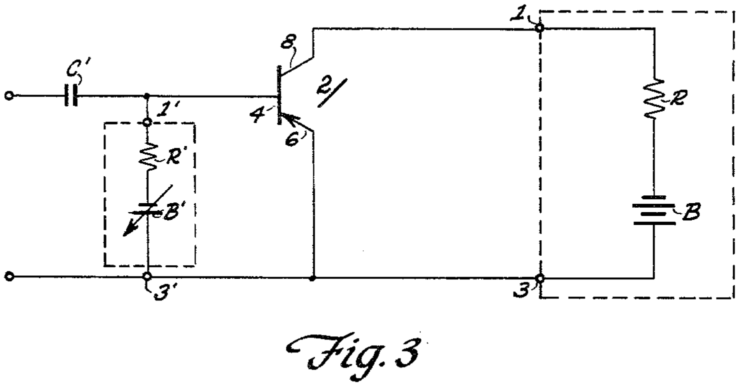
FIG. 3 is a further modification of the system of FIG. 1, illustrating video or audio loads associated with the direct-current biasing conditions of FIG. 1.

As before stated, the circuit of FIG. 1 illustrates only direct-current voltage supply conditions. In the circuit of FIG. 2, however, the alternating-current conditions for, for example, a radio-frequency signal source and a load, are shown. In the system of FIG. 3, furthermore, similar signal conditions are illustrated for a video or audio-frequency load. Radio-frequency by-pass capacitors C are shown shunting the respective output and input circuit direct-current sources, in the system of FIG. 2, and an input coupling capacitor C′ is shown in the circuit of FIG. 3. In the circuit of FIG. 3, moreover, the resistor R may itself represent the video or audio load, as well as the power supply internal resistance.

In order not to complicate the disclosure or to detract from the central features of the invention, in the other embodiments shown in the drawings, these signal connections are omitted, but it is to be understood that they may equally well be incorporated therein.

In the modified circuit of FIG. 4, a different circuit arrangement is provided with the base-electrode 4 connected to the lower and perhaps grounded terminal 3′, but with the other conditions and relative power and voltage values the same as before discussed.

It is not necessary that there be a separate direct-current source B′R′ schematically shown in FIGS. 1 through 4. Instead, a voltage-divider network R″ may be provided as in the embodiment of FIG. 5, having an intermediate voltage tap or slider point P from which a negligible voltage, as compared to the actual voltage of the source BR and output voltage of the relay 2, is tapped off. This tapped source voltage is fed by conductor 10 to the base electrode 4 in the embodiment of FIG. 5. In this case, therefore, the tap P becomes the terminal 1′, and the terminal 3 of the direct-current voltage supply BR becomes, also, the terminal 3′ of the before-mentioned further direct-current supply source. A variation of the tap P will accomplish the same result as variation of the source B′ in FIGS. 1 through 4, provided the relative values of power and voltage remain as previously described.

The same type of circuit is shown in FIG. 6, modified, however, so that the voltage divider network R″ is connected across the battery or other direct-current supply B, with the resistance R then representing, in effect, the emitter current-stabilizer resistance, which for purposes of understanding the present invention, is considered as part of the direct-current power source.

As as practical illustration, typical circuit-elements and values for the circuit of, for example, FIG. 6, are as follows:

The transistor 2 may be a 2N1398 germanium-mesa transistor serving as a radio-frequency amplifier relay in the VHF television band of, for example 54 to 216 megacycles. The main power supply may combine a direct-current 18-volt source B, in series with a 3.3 ohm emitter-current stabilizer resistor R, and the voltage divider R″ may have a 10,000-ohm total value. The maximum allowable collector-to-base junction power dissipation will be of the order of 25 milliwatts; the predetermined voltage to be developed between the collector and the emitter in FIG. 6 is about 9 volts; and the open-circuit voltage supplied at terminals 1 and 3 will then be, in accordance with the present invention, substantially 18 volts, with a maximum available power that the source B, R can deliver between the terminals 1 and 3 being adjusted, through relative adjustments of the values of R and R″ to be about 25 milliwatts. The critical relationships before described are then attained, and the result of being enabled to minimize distortion with any kind of transistor relay 2 of the type to be placed in the circuit, may easily be effected in mass production merely through the single adjustment of variation of the tap or slider P while automatically keeping the collector-to-base voltage-current product substantially constant despite this variation, and without the necessity for varying other controls in other parts of the circuit.

The modified circuit of FIG. 7 is illustrated in connection with the alternating-current mains plug 12, which connects through a resistance 14 and a rectifier D in series with the terminal 1. The same reference numerals and letters are applied to elements in FIG. 7 as, for example, are applied to corresponding elements in the circuit of FIG. 6, and it will be observed that the shunt-connected filter capacitor C″ is connected across the divider network R″. The values of the series resistance 14 and resistance R will be adjusted in the length of the divider network R″ to provide the before-described critical maximum available power and open-circuited voltage values at the terminals 1 and 3.

Further modifications will occur to those skilled in the art and all such are considered to fall within the spirit and scope of the invention as defined in the appended claims.

What is claimed is:

1. A transistor relay having base, collector and emitter electrodes, a source of direct-current power having at least two terminals, one of which is connected to the collector and the other terminal of which is connected to one of the other electrodes, the relay having a predetermined maximum allowable collector power dissipation and a predetermined voltage to be developed between the collector and the said one of the other electrodes, a further source of direct-current voltage connected between the base and emitter electrodes, said relay having the following critical conditions:

(1) the first-mentioned source having a maximum available power substantially equal to the said predetermined power dissipation, (2) the first mentioned source, when open-circuited, having a direct-current voltage value substantially equal to twice the said predetermined voltage, (3) the further source having a direct-current voltage value very small compared with the said predetermined voltage, and single control means for varying the value of the voltage of the further source, and as the result of the concurrence of said conditions, for substantially minimizing distortion while maintaining the collector power dissipation substantially constant.

2. A transistor relay as claimed in claim 1 and in which the said further source comprises a voltage divider network connected across a pair of terminals of the first-named source and from which the said connection to base and emitter draws substantially negligible power.

3. A transistor relay as claimed in claim 2 and in which the said first-named source comprises alternating-current input terminals, series-connected resistance and rectifier means, shunt-connected filter capacitor means connected across the said divider network, with the value of the said series resistance and the resistance of the said divider network being adjusted to provide the said maximum available power and open-circuited voltage values.

4. A transistor relay as claimed in claim 2 and in which said voltage divider network comprises a potentiometer having a variable tap connected to one of said other electrodes.

References Cited by the Examiner

FOREIGN PATENTS 543,201 10/1956 Belgium.

OTHER REFERENCES

Angelo: "Electronic Circuits," McGraw-Hill Book Company, Inc., chapter 2, FIG. 2–7, pp. 14, 15, 104, 114 and 172.

Arguimbau: Vacuum-Tube Circuits and Transistor, Wiley & Sons, Inc., New York, May 1959, chapter V, FIGS. 2 and 26, pages 144 and 180.

ROY LAKE, *Primary Examiner.*

ARTHUR GAUSS, NATHAN KAUFMAN, *Examiners.*